United States Patent [19]

Fields et al.

[11] Patent Number: 5,111,391
[45] Date of Patent: May 5, 1992

[54] SYSTEM AND METHOD FOR MAKING STAFF SCHEDULES AS A FUNCTION OF AVAILABLE RESOURCES AS WELL AS EMPLOYEE SKILL LEVEL, AVAILABILITY AND PRIORITY

[75] Inventors: Randall K. Fields, Woodland; Paul R. Quinn; Todd Blackley, both of Park City, all of Utah

[73] Assignee: Mrs. Fields, Inc., Park City, Utah

[21] Appl. No.: 417,643

[22] Filed: Oct. 5, 1989

[51] Int. Cl.$^5$ .............................................. G06F 15/21
[52] U.S. Cl. ...................................... 364/401; 364/408
[58] Field of Search ................................... 364/401, 468

[56] References Cited

U.S. PATENT DOCUMENTS

| 4,562,530 | 12/1986 | Umeda | 364/148 |
|---|---|---|---|
| 4,700,295 | 10/1987 | Katsof et al. | 364/401 |
| 4,700,297 | 10/1987 | Hagel | 364/408 |
| 4,852,001 | 7/1989 | Tsushima et al. | 364/401 |

OTHER PUBLICATIONS

*Names Scheduling System*, 1989, AT&T.
*People Planner Scheduler*, 1987, Information Marketing Business, Inc., Cambridge, MA.

*Primary Examiner*—Gail O. Hayes
*Attorney, Agent, or Firm*—A. C. Smith; Greg T. Sueoka

[57] ABSTRACT

A staff scheduling data processing system and method schedules staff and management personnel at locations remote from a central location by applying central location policy to unique remote location data to insure the optimum staff schedule for each remote site. The system and method includes a data base for storing and retrieving information characterizing: central office policy; applicable labor requirements; tasks that need to be performed; skill levels required to perform tasks; resources that may confine or facilitate the scheduling of a task at a given time; relationships between tasks that will alter the placement or movement of a task on a schedule; employees with associated skill levels and priorities and availability; the employee's start-time and stop time, the percentage of an employee's time that it takes to work on a particular task; and the positive or negative slide in relation to the task's completion time by an employee. Upon request to create a schedule for a given day for a remote location, the system and method selects all the tasks to be performed on that day, and using historical data about that location, the tasks, the skill required to complete the tasks, the available resources, employee availability, and central office policy, creates an optimized display of the required schedules.

12 Claims, 6 Drawing Sheets

SYSTEM AND METHOD FOR MAKING STAFF SCHEDULES AS A FUNCTION OF AVAILABLE RESOURCES AS WELL AS EMPLOYEE SKILL LEVEL, AVAILABILITY AND PRIORITY

BACKGROUND OF THE INVENTION

1. Field of Invention

This invention relates to an improved system and method for the creation of staff schedules at remote locations that take into account location specific values and historical data, while simultaneously conforming to corporate policy regarding scheduling standards and labor regulations.

Managing multi-unit retail locations that are geographically dispersed is a challenging task, and a key to successful operation of multi-unit retailing or chain franchising is consistency. Training location managers to be consistent in applying company standards is subject to each location manager's interpretation of the company standards. Complex federal, state and local labor regulations require additional training of the location manager to assure compliance, for example, with state-required minimum and maximum shift lengths, required paid and unpaid breaks, and labor regulations which place additional restrictions on employees who are minors. High rates of personnel turnover in this segment of the market further complicates this task. If this task could be successfully taught, the expense of constantly retraining replacement personnel would be high.

The job of creating staff schedules is complex, and involves such variables as the definitions of each task, the percentage of an employee's time that it takes to do a particular task, the day of the week, month, or year in which the task should be performed, the skill levels of employees available to perform each task, resource constraints such as equipment capacity at the location that facilitate or prevent a task from being scheduled, relationships between tasks that affect their placement and movement on the schedule, calculations for each task for a task's length, start time, positive and negative tolerances in completing a task, and employee availability by day of the week, hours of the day, their skill level and priority or seniority levels or categories.

Each remote location has unique differences in layout, sales patterns, sales volume, and product mix. These differences are further complicated by the uniqueness of each day of the week and seasonality of the year. Such variables must be combined and examined to create a unique optimum staff schedule for each remote location. Creating an optimum schedule is a job which does not lend itself to be taught well to the typically minimum wage employee of a multi-unit retail organization. The complexity of creating an optimized staff schedule approaches the complexity of linear programming and the solving of multiple simultaneous equations. These are processes that the human mind is not well suited to perform.

As a result organizations resort to a substandard and labor-intensive manual method of creating staff schedules that are typically not optimized for the tasks.

2. Summary of the Invention

Accordingly, the present invention provides an automated staff scheduling system and method in which the variables associated with making an optimum staff schedule can be defined, maintained, and consistently applied. The present invention also provides an automated staff scheduling system and method which can be operated by relatively unskilled operators and which requires little technical knowledge or supervision. Also, the present invention provides an automated staff scheduling system which represents and utilizes a corporation's staffing policy when creating staff schedules at each remote location. In addition, the present invention provides a method which incorporates state, federal and local labor regulations (referred to herein as 'state' regulations) and corporate policy when creating schedules.

Accordingly, the present invention obviates the above mentioned drawbacks of the prior art systems and provides a system and method for generating optimum staff schedules that are unique to each of a plurality of remote locations given a plurality of variables. These optimum schedules take into account: the tasks that need to be scheduled and when they should be scheduled; the skill levels of employees that are available to perform the tasks; the resources available to facilitate tasks; the relationships between tasks; calculations to combine unique location values with unique location historical data and corporate policy to determine the length, start time, and positive and negative slide for a task; employee availability by day of the week, and hours of the day, skill level, and priority of seniority levels; and applicable 'state' labor regulations. As used herein, positive and negative slide for a task refers to the latitude or tolerance of shifting the end point(s) of a task forward or backward in time. The present system and method thus minimizes the training times required for location managers and brings more expertise to bear on this complex task than is possible with traditional manual scheduling schemes.

DESCRIPTION OF PREFERRED EMBODIMENTS

Figure 1A:
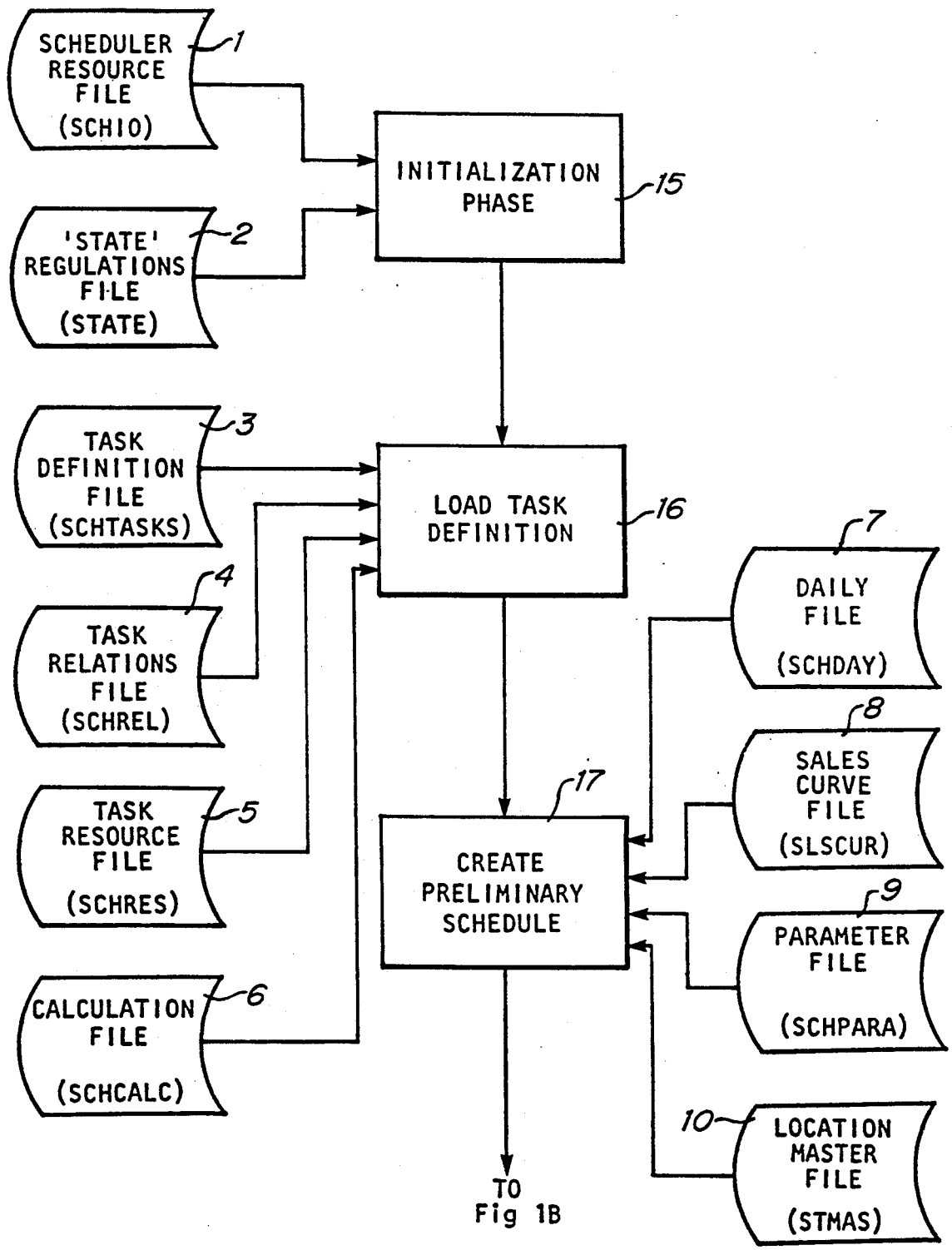
FIG. 1 is the data flow diagram which shows how the invention accesses, manipulates, creates and stores information during its creation of a staff schedule.
Figure 1B:
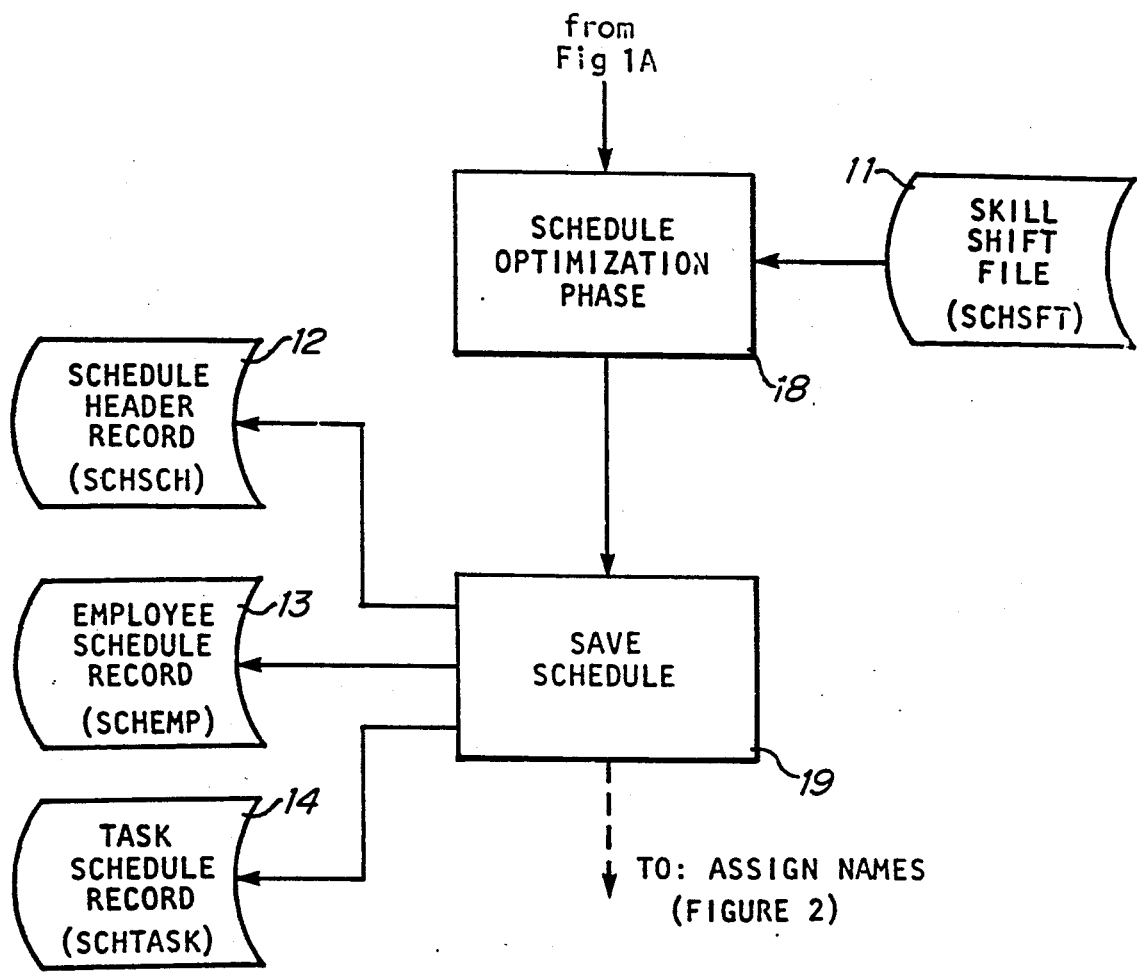
Figure 1:
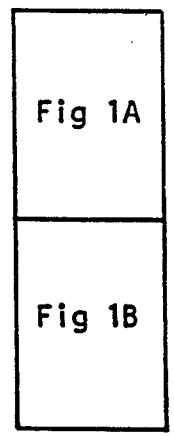

Referring now to FIG. 1, there is shown a flow chart illustrating how the invention accesses, manipulates, creates and stores information during its creation of a staff schedule.

Initialization Phase

Figure 4:
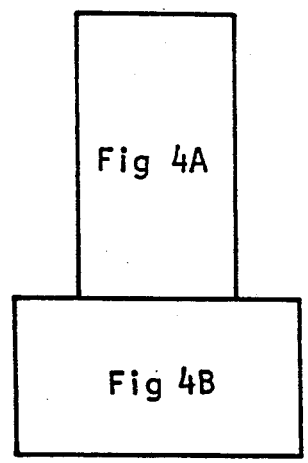
FIG. 4 is the block schematic diagram of the workstation at the remote location disposed for connection to a host computer.
Figure 4A:
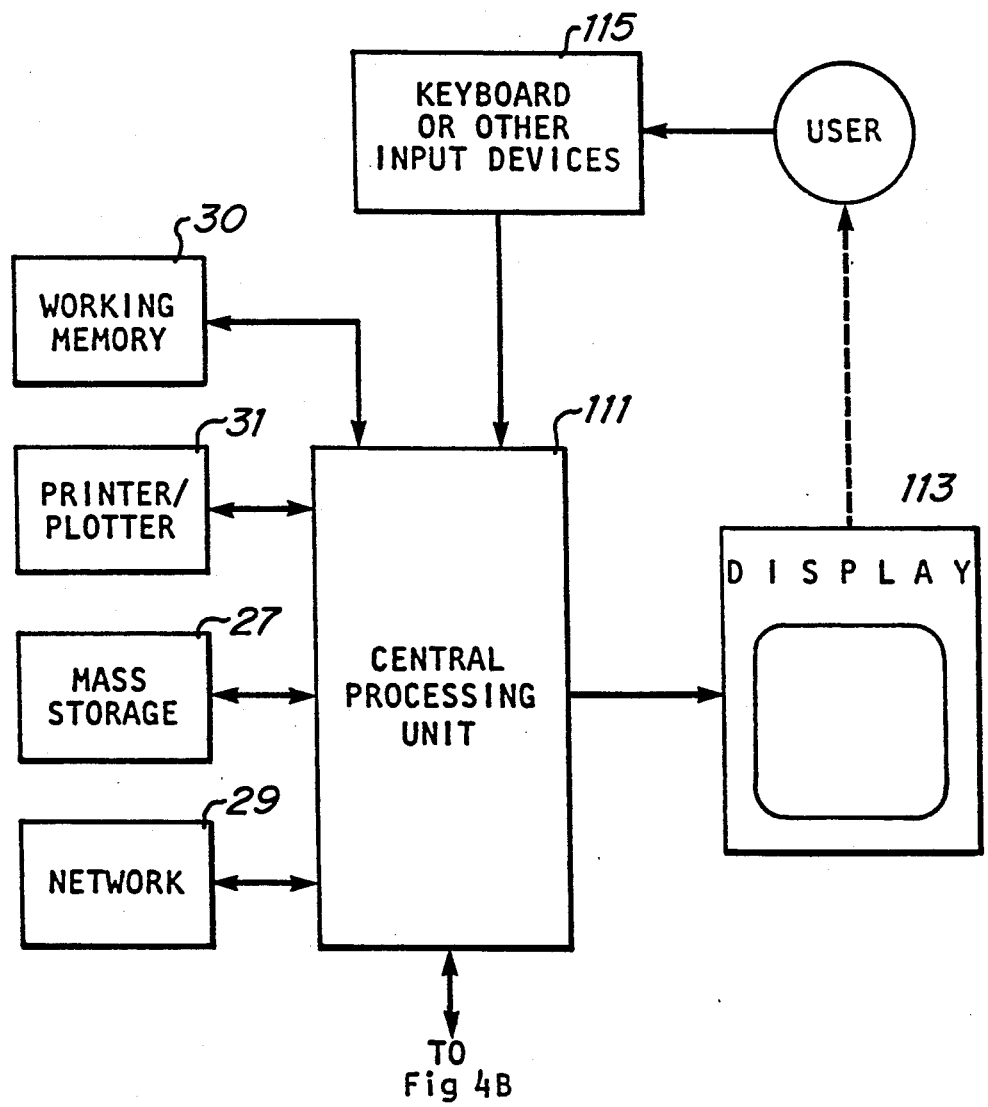
Figure 4B:
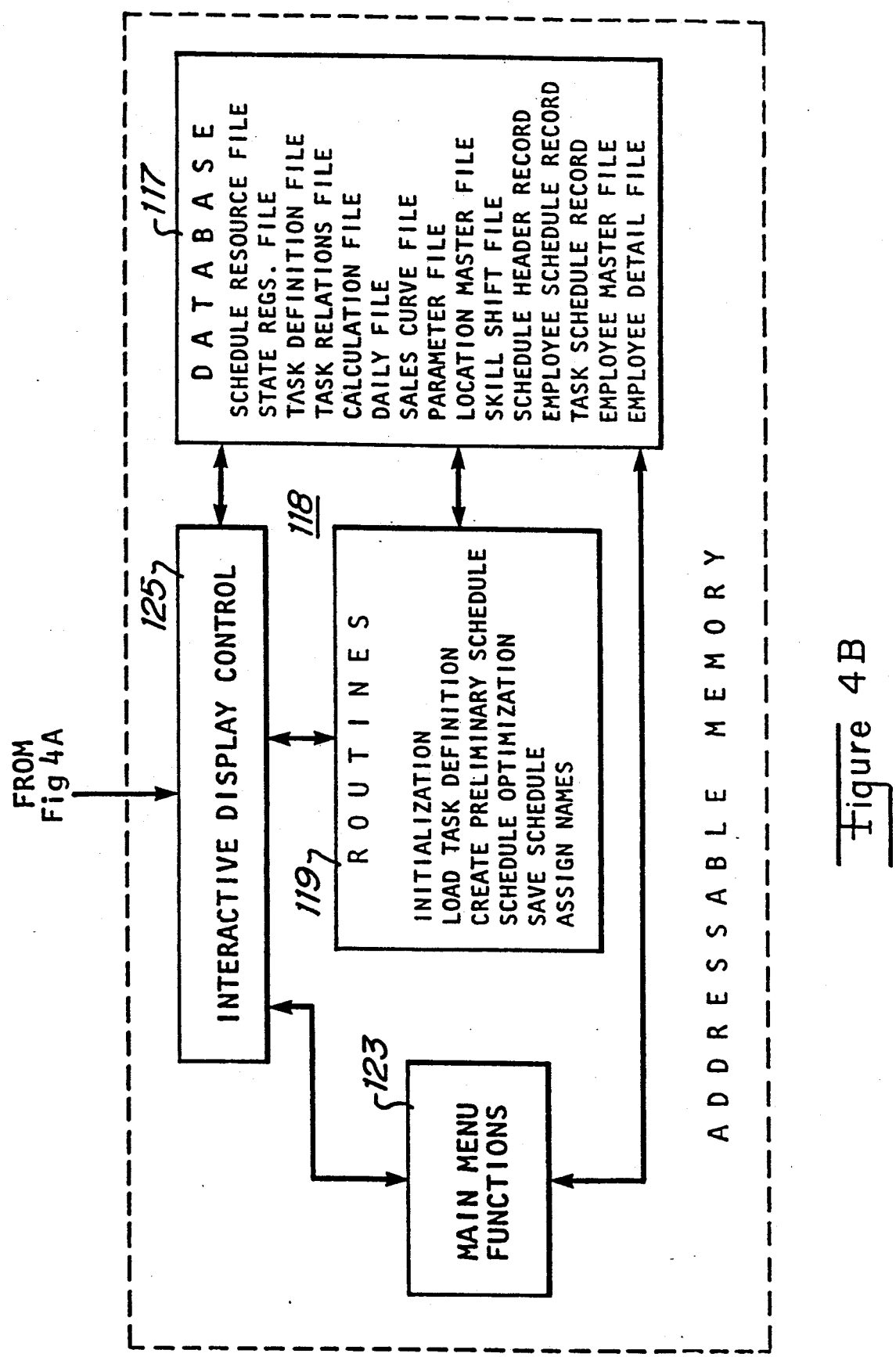

Referring to FIGS. 1 and 4, in the Initialization Phase, the invention loads the Scheduler Resource File 1 and the State File 2 from the Mass Storage 27 in FIG. 4 into the Working Memory 30 in FIG. 4, The Scheduler Resource File 1 specifies which resources will be used in the schedule and where to find the initial values of these resources. A resource is an item that may be of limited supply, or a reference value or a value that is modified as the other values on the schedule change. The Scheduler Resource File 1 contains the resource type, the name of the resource and whether the particular resource is being created or updated. There are three types of resources: Decreasing (the resource is 'consumed' or committed as a task is scheduled, for example, equipment), increasing (the resource is accumulated as a task is scheduled, for example, people), and Constant (the resource must simply exist with no regard to its capacity in order for the task to be scheduled).

The State File 2 defines the minimum and maximum time an employee may work before the applicable labor regulation requires a paid or unpaid break, the maximum hours an employee may work before being paid overtime by day and week, and also defines the minimum and maximum shift lengths as required by applicable labor regulations.

Load Definition of Each Task

After the Scheduler Resource File 1 and the Break Logic Shift Length File 2 have been loaded into Working Memory 30, as shown in FIG. 4, the Process loads the definition for each task. This routine loads the Task Definition File 3, the Task Relation File 4, the Task Resource File 5 and the Calculation File 6 from the Mass Storage Device 27 in FIG. 4 into the Working Memory 30 in FIG. 4.

Figure 3:
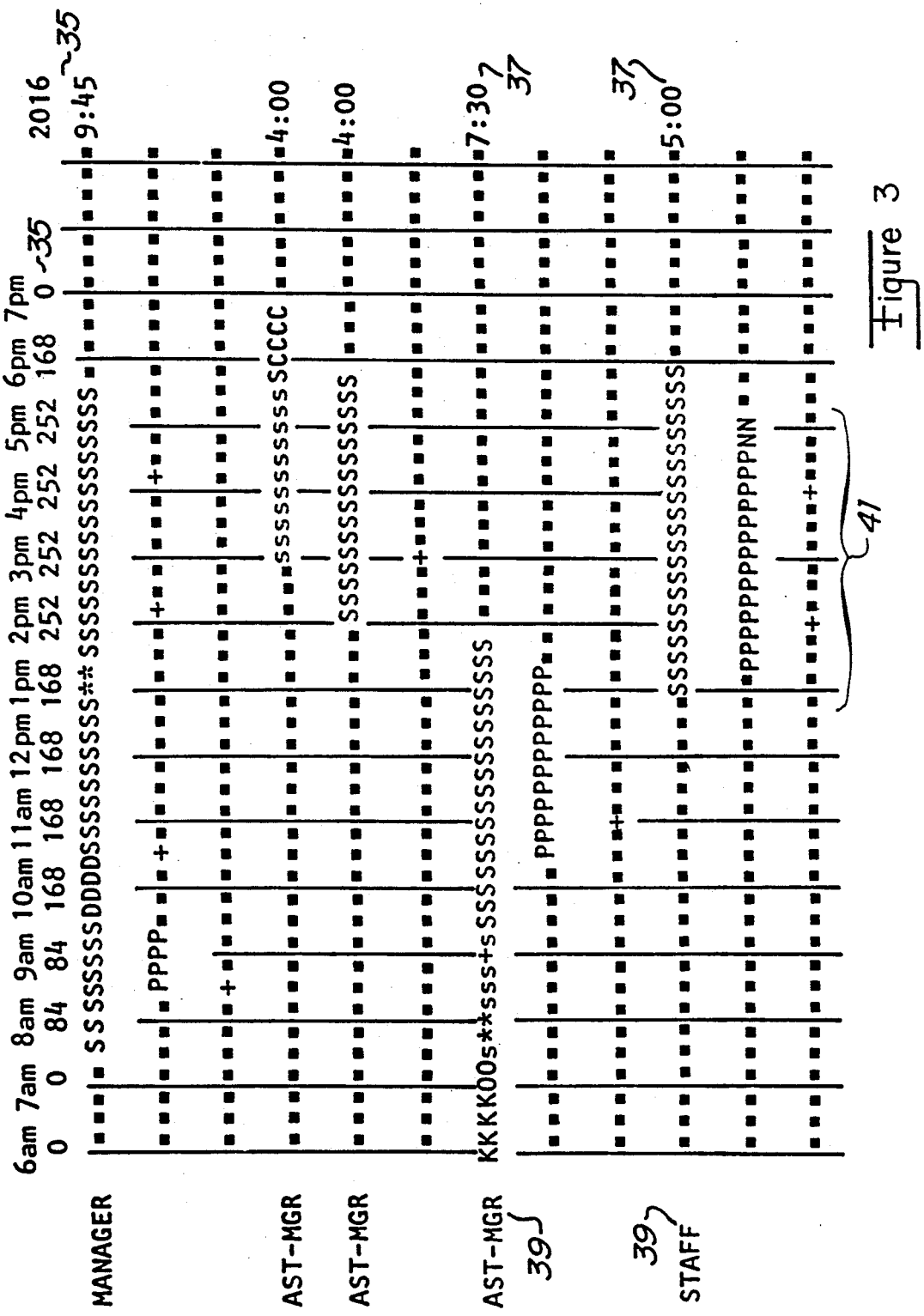
FIG. 3 is the Schedule Bar Chart prepared in accordance with the present invention.

The Task Definition File 3 defines the tasks that are to be scheduled. It contains information about the day of the week on which the task is to be performed, the required skill level for this task, the percentage of an employee's time that it takes to do a particular task (from 1% to 100%), flags for task type and task placement, and the letter code (e.g., P, S, C, D, and the like) to represent the task on the Schedule Bar Chart, as illustrated in FIG. 3.

The task type flags indicate whether a task can be split, whether a task is a pool task, whether the task skill level can be changed when an employee is moved from this task, and whether a task allows a break to replace this task. Task placement flags change the way a task is placed on the schedule. The invention uses the task type flags and task placement flags to improve the performance of each task while optimizing the schedule. It optimizes the schedule by taking into account the duration of a task, each task's start-time, and the positive and negative slide for a task.

The Task Relation File 4 defines the relationships between tasks and events. It describes how each task is related to other tasks or events. For example, certain tasks can only be performed after another task has been completed, but before closing time for that location. When defining the relationships between tasks and events, the invention is able to define multiple groups of relationships. During the process of placing a task on a schedule, each group of relations are tested and if no relation is violated in that group, the task is placed on the schedule. Otherwise, the next group of relations are tested.

The Task Resource File 5 defines the resources that are referenced by each task. It contains the resource type and the quantities and capacities of each resource that can restrict or enable a task to be scheduled. Resources are tracked every 15 minutes on the schedule and are used to determine if an item is available for a particular task.

The Task Resource File 5 references resource definitions in one of three files: (i) the Location Master File 10 which contains values unique to each location that are then used to define resources or are used in calculations to define task attributes; (ii) the Daily File 7 which contains values for a specific day which deviate from the normal values and which may cause additional tasks to be scheduled; and (iii) the Sales Curve File 8 which contains values for a particular location's past performance which is stored by time period during the day, by each day of the week and for each season of the year.

The Calculation File 6 contains information which allows the invention to access data from various files and perform operations to calculate a task's start-time, the duration of the task, the positive and negative slide for the task, and the task manpower percent.

The calculations feature uses data from the Calculation File 6 to perform calculations on the values retrieved from the Parameter File 9, the Location Master File 10, the Sales Curve File 8 and the Daily Questions and Response File 7. Five math functions can be used on or between any of these values, such as addition, subtraction, multiplication, division and remainder. The calculations feature can also perform other calculation sets to achieve a nesting or parenthetical structure of calculations and logic.

The Parameter File 9 contains look-up table values and is used to incorporate various corporate standards into the scheduling process. The Parameter File 9 also contains the skill level matrix which cross references a given skill level to other skill levels to determine which other skill levels a given skill level is able to perform.

One aspect of the invention is the flexibility provided to modify the values that affect the way a task is scheduled without altering the program logic. This is possible because the Task Relation File 4, the Task Resource File 5, and the Calculation File 6 are located in separate external files.

Create Preliminary Schedule

Each task is processed in the order of its priority, as defined in the Task Definition File 3. The invention accesses the Task Definition File 3 and retrieves the skill level required for each task. Next, the invention determines the task's duration, the percentage of an employee s time that it takes to do a particular task (from 17% to 100%), and defines the boundaries of a window which reflects the task's start-time and stop-time, taking into account the positive and negative slide for each task. If these values are not defined in the Task Definition File 3, then they will be retrieved from either the resource constraints, or from calculations in the Calculation File 6.

After the priorities of the tasks are determined, the process determines the required manpower by skill level. The skill level matrix in the Parameter File 9 is accessed to determine the highest skill level that can perform the task. Using placement logic for each task, it places the task on the schedule within the Task Placement window, which is defined by the schedule's start-time, task duration, and the positive and negative slide for the task. The placement logic has the ability to look at what shifts are currently on the schedule and the current task's placement window, and then find the best existing shift to which to append the current task.

Due to the limited computational power available at a remote location, it is not possible to solve multiple simultaneous equations which are typical of the linear programming nature of scheduling. Therefore, the representation of calculations and placement logic in a rules fashion serve to incorporate as much human reasoning and logic into the process to minimize the computational power required to solve the problem in a timely fashion. By combining the task priority and the placement logic, the relative placement of a task on the schedule can be controlled to include corporate policy and expertise in the ordering of tasks on the schedule.

Optimize Schedule by Shifts and Breaks

Once the Preliminary Schedule 17 is created, the process continues in the Schedule Optimization Phase 18. In an optimal fashion, this phase divides the schedule into different shifts and inserts breaks in the shifts where necessary. First, the invention accesses the Skill Shift File 11 and retrieves the preferred minimum and maximum shift lengths as well as any preferences in order to build minimum, maximum, or average length shifts.

The Skill Shift File 11 defines the skills that are expected to be generally available at the particular location and also contains values which define the preferences on the length of a shift by skill level. A shift can be defined in numerous ways such as (i) the duration of the shift is only as long as the length of the tasks; (ii) fill the shift to the maximum shift length or the minimum shift length; or (iii) must be the first shift or the last shift. The corporate policies may be incorporated and optimized by allowing this logic to define the minimum and maximum length of time for a shift in accordance with corporate policies for each skill level.

The Schedule Optimization Phase 18 is able to remove any sudden increased requirements in a location's demand for a given skill level. This occurs when the created schedule positions persons with the same skill level to perform different tasks at the same time. The process smooths this sudden demand requirement for a given skill level by taking the sudden increased requirement for the given skill level and testing it for the following conditions:

(i) if sudden increased demand for a given skill level is less than fifty percent of the length of the minimum shift of that skill level, and (ii) the sudden increased demand for a given skill level is more than two-thirds of a minimum shift away from a shift which is eligible to be appended to the shift with the sudden increased demand for a given skill, and (iii) the sudden increased demand for a given skill level is less than the product of the total number of available employees with this skill level multiplied by the threshold of the shift which is defined in the Skill Shift File 11, in order to alter the schedule to accomodate the sudden increased demand for a given skill level. This tends to even the demand for a given skill level on the assumption that an individual can perform at more than 100% of capacity for a short period of time. Resulting manpower task lines are illustrated in FIG. 3 as one-letter coded task, as later described herein.

The invention divides the schedule into shifts in the following manner. Starting with the highest skill level, the tasks to be done are allocated to different shifts according to the shift logic defined in the Skill Shift File 11. As each shift is created, the remaining tasks on the task line for that skill level are evaluated to see if they can be pushed to a lower skill level. The process of first placing the task at the highest skill level and then trying to move the task to a lower skill level when creating shifts ensures that a full shift will be built around a task that requires the higher skill level, but will move other tasks to a lower skill level to minimize costs.

After every task by its required skill level has been separated into shifts, the applicable state, federal, local regulations are retrieved from the State Master File 25, and this information is used to insert breaks into each shift. Using the applicable labor regulations, the optimization process inserts a break between the start-time and stop-time for each shift, where the interrupted tasks will best append to the beginning or end of another shift. Finally, any dangling or isolated tasks whose length does not entirely fill the time between the start-time and stop-time of a shift, are combined with designated filler tasks to completely fill this empty time.

At the completion of the Schedule Optimization Phase, different portions of the schedule are saved into three different records so that the schedule can be printed or edited at a later time, which records include the Schedule Header Record 12, the Employee Schedule Record 13 and the Task Schedule Record 14.

The Schedule Header Record 12 contains one record per schedule and each record contains summary information of the schedule. The Employee Schedule Record 13 contains one record per scheduled employee with that employee's name, skill level and the start-time and stop-time for that employee's shift. The Task Schedule Record 14 contains the task information for each employee, and holds, among other things, the schedule date, the employee skill level, the name of the task, the task's start-time, the task's duration, the skill level required by the task, and the positive and negative tolerances of the task.

Figure 2:
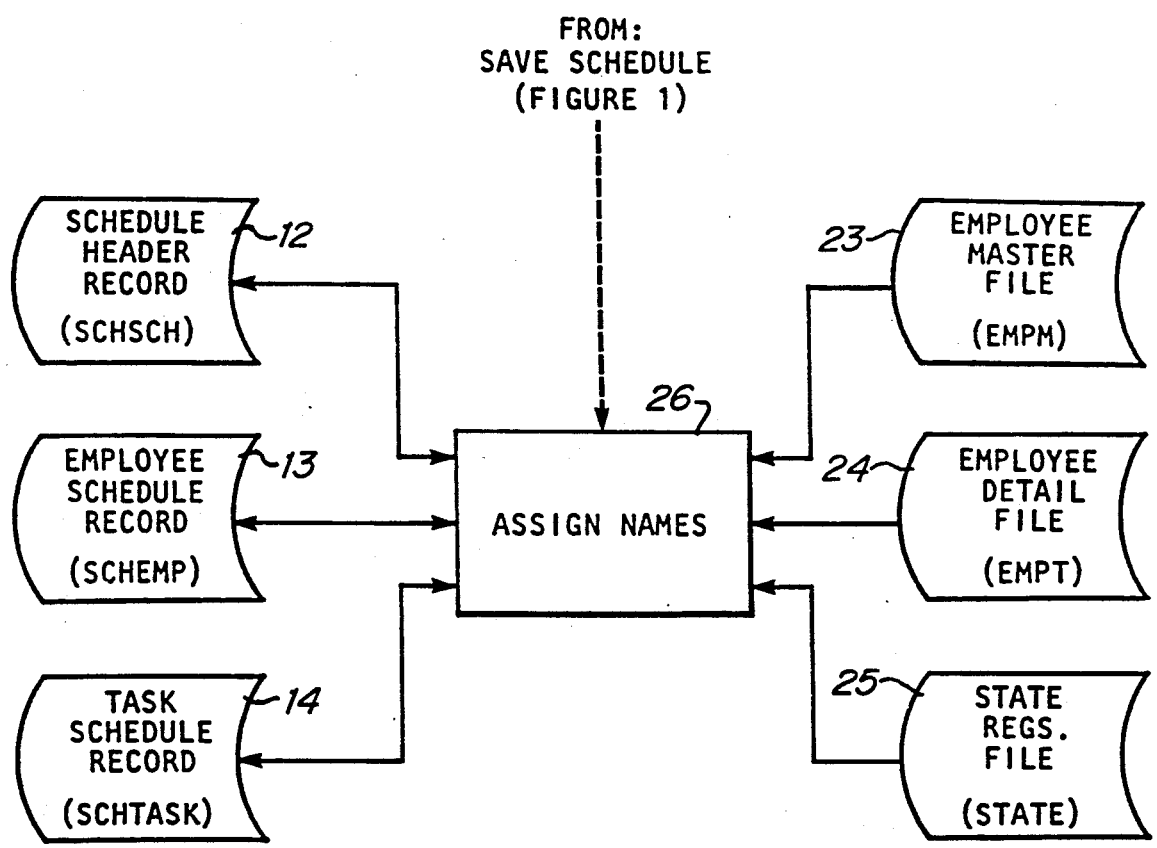
FIG. 2 represents the data flow into the process of assigning names to the different shifts in the created schedule.

Referring now to the chart of FIG. 2, the Assign Name Phase 26 assigns worker names by the week or days of the week. The information is accessed from the Schedule Header Record 12, the Employee Schedule Record 13, and the Task Schedule Record 14.

For each of the selected days of the week, the total employee availability is determined and the Employee Master File 23 and the Employee Availability File 24 are accessed to obtain information concerning the employees.

The Employee Master File 23 contains basic information about the employee such as the employee's name and address as well as the employee's pay rate, and the address of the location where the employee works.

The Employee Availability File 24 contains information for each employee by day of the week. It contains the skill level and priority of the employee, and the availability by hours of the employee.

The invention initially assigns employee names to the day with the least total employee availability, followed by the next most restrictive day and so on. Within a given day, employees names are assigned by skill level. Within a given skill level, the available employees on that day that can perform the skill level will be sorted by their priority and the percentage of their minimum or maximum hours which have been already scheduled. Once all employees of equal skill and priority have reached their minimum requested hours for the week, the employees are sorted by such preferences as the percentage of requested maximum hours for a week. And, the State File 25 is retrieved to ensure that no minor is assigned to a shift in violation of any applicable labor regulations.

Employees are assigned to shifts based on this sort order as long as they are available for the entire duration of the shift. If no employee possess the skill level or no employee with the skill level is available, a message is displayed 113 to notify the operator. This logic, first processes each skill level in the day, and then processes each selected day in the week. After the assignment of names to shifts is finished, the data is sent back to the Schedule Header Record 12, the Employee Schedule Record 13, and the Task Schedule Record 14.

Referring now to FIG. 3, there is shown one embodiment of a Scheduler Chart for a given day of the week, designating tasks by one-letter codes. The chart including the letter codes may be displayed 113 and printed out on a printer or plotter 27 in the system of FIG. 4 to provide an indication of the tasks and manpower requirements, for example on 15-minute intervals, throughout a given day 33 across the top of the chart, there appears the business hours of the day along the absissa axis, with quarter-hour intervals interposed between one-hour time lines. The chart also illustrates a value 35 which constitutes a projected total business demand distributed by hour, and additionally illustrates on the right border the time duration 37 of the various skill level requirements for the tasks involved that day. On the left border of the chart, there is illustrated the skill levels 39 for the tasks throughout the day (before assigning employee names), and these skill-level designations will be replaced by applicable employee names after the Assign Names procedure 26 of FIG. 2. The chart illustrates that a given shift 41 over a selected time interval may thus include several tasks with assigned employees performing the letter-coded tasks for designated intervals between the scheduled start and stop times.

Referring now to FIG. 4, there is shown a block schematic diagram of a computer system for operation according to the present invention at a remote location and including a network communication port 29 for connection to a host computer, for example, via telephone dial-up network. The system includes a central processing unit 111 which is connected to control the display device 113 in response to inputs supplied to the CPU 111 via the user's manipulation of the keyboard 115, or via other inputs supplied through a conventional network interface 29 (e.g., modem, bar-code readers, standard network bus, and the like). The CPU 111 accesses memory 118 which contains information that is supplied via the keyboard 115 or the network 29 (e.g., RS232 bus connection to a point-of-sale terminal), or is transferred thereto in conventional manner from mass storage medium 27 or working memory 30. The memory contains instructions 119 for executing the routines on information that is stored in the several fields 117 according to the present invention previously described. The memory also includes main menu functions 123 and buffer storage or interactive display control 125 for synchronously displaying lines of data bits on display device 113 in conventional manner. Permanent records and periodic reports such as the chart of FIG. 3 may be plotted or printed out 31 under control of the CPU 111.

In accordance with the present invention, several files of information in data base 117 are gathered and stored regarding applicable labor regulations, employee information, task definitions, task relations, and the like, as previously described, and these files are accessed and modified under control of the CPU 111 in response to the scheduling routines 119 such as the initialization, create preliminary schedule, optimization, assign names, and the like, as previously described for controlling the display on display device 113 of a chart of the tasks and required manpower at prescribed time periods throughout the day.

APPENDIX:

This file contains any number of calculation records for a given task or for a resource. These values may be calculated and/or looked up in a reference file.

| Position | Length | | Description |
|---|---|---|---|
| 1 | 5 | Key | This is the Task ID to whom these calculation records belong. |
| 6 | 2 | Key | This is the field (or calculation) number used to specify what calculation is to be done for Task Length, Percent, etc.<br>"1" - Task start time.<br>"2" - Task length.<br>"3" - Task positive slide.<br>"4" - Task negative slide.<br>"10..99" - Other values. |
| 8 | 2 | Key | This field can have any number of calculation numbers. Each calculation number has any amount of sequences. |
| 10 | 2 | Key | This is the sequence that the calculation records will be processed in (1..99). For a given FIELD NUMBER there will be one or more records with sequence numbers. These records will be processed in sequence, forming the calculation to be done. |

| Position | Length | Description |
|---|---|---|
| 12 | 2 | The type of calculation to be done. Values are:<br>"0" - Resource file lookup using the RESOURCE TYPE, SUB TYPE, and RANGE)<br>"1" - Location file lookup (Using the FILE KEY)<br>"2" - Daily file lookup (Using the FILE KEY)<br>"3" - Parameter file lookup (Using the PARAMETER KEY)<br>"4" - Constant<br>"5" - Perform another Calculation (using CALCULATION RECORD) |
| 14 | 2 | This is the Calculation to perform (a new field number) when using calculation types 3 or 4. When this calculation is complete, then that calculated value will be used in the calculation sequence. |
| 16 | 8 | This is the key for location or daily file lookups. |
| 24 | 8 | This is the key for Parameter file lookup, with the value that a calculation has returned. |
| 32 | 2 | This is the resource type to use on a resource lookup. |
| 34 | 2 | This is the resource sub-type to use on a resource lookup. |
| 36 | 2 | This defines the range to look up when doing a resource lookup.<br>"0" - 0..181. Add all of the numbers in the resource TYPE, SUB TYPE from 0 to 181 and return that number.<br>"1" - Return the total for the numbers over the whole length of the task that this calculation is for.<br>"2" - Return the number in the resource that appears at the start of the task that this calculation is for. |
| 38 | 6 | This is the constant to use if a calculation type 4. |
| 44 | 1 | This is the operation to perform on values or to signal the end of the calculation sequence. Values are:<br>"0" - End of sequence<br>"+, -, *, /, % (Mod)" |

The operation of the calculation records is the same as the HP calculators (using RPN). The Operator acts between the next value and the current value (backwards).

File Status for SCHCALC.DDF

Record Length = 44        Variable Records = No
Number of Keys = 1
Page Size = 1024          Unused Pages = 0

| Key | Position | Length | Duplicates | Modifiable | Type | Null |
|---|---|---|---|---|---|---|
| 0 | 1 | 11 | No | No | String | -- |

The SCHDAY file contains the answers to the daily questions that are used in the scheduled program. The answers are keyed by date, schedule flag, and question key. When the Scheduler is run, it will read the SCHDAY file from the oldest to the newest date. Only the dates that have schedule flags set to "0" will be scheduled. After a day has been scheduled, that day's answers will have the schedule flag changed to "1", to signal that it has been scheduled.

| Position | Length | | Description |
|---|---|---|---|
| 1 | 1 | Key | Day of week. |
| 2 | 8 | Key | Answer key. |
| 10 | 35 | | Answer. |
| 45 | 1 | | Answer Type (as above). |
| 52 | 1 | | This is the type of data stored in the answer field. Valid values are: |

"0" — Floating Point (First six characters).
        "1" — Integer.
        "2" — Time (with am/pm).
        "3" — Length of time (without am/pm).
        "4" — Y/N (Y=1, N=0).

File Status for SCHDAY.DDF

Record Length = 46    Variable Records = No
Number of Keys = 1
Page Size = 1024    Unused Pages = 0

| Key | Position | Length | Duplicates | Modifiable | Type | Null |
|---|---|---|---|---|---|---|
| 0 | 1 | 9 | No | Yes | String | -- |

The SCHDAY file contains the answers to the daily questions that are used in the scheduled program. The answers are keyed by date, schedule flag, and question key. When the Scheduler is run, it will read the SCHDAY file from the oldest to the newest date. Only the dates that have schedule flags set to "0" will be scheduled. After a day has been scheduled, that day's answers will have the schedule flag changed to "1", to signal that it has been scheduled.

| Position | Length | | Description |
|---|---|---|---|
| 1 | 1 | Key | Day of week. |
| 2 | 8 | Key | Answer key. |
| 10 | 35 | | Answer. |
| 45 | 1 | | Answer Type (as above). |
| 52 | 1 | | This is the type of data stored in the answer field. Valid values are: |

"0" — Floating Point (First six characters).
        "1" — Integer.

```
"2"  -  Time (with am/pm).
"3"  -  Length of time (without am/pm).
"4"  -  Y/N (Y=1, N=0).
```

File Status for SCHDAY.DDF

Record Length = 46          Variable Records = No
Number of Keys = 1
Page Size     = 1024        Unused Pages = 0

| Key | Position | Length | Duplicates | Modifiable | Type   | Null |
|-----|----------|--------|------------|------------|--------|------|
| 0   | 1        | 9      | No         | Yes        | String | --   |

This file contains the information for all of the employees on the schedule. Each employee will have any number of tasks (in TASK.DDF) that belong to a single employee record. These records are NOT in ASCII format.

| Position | Length | Description |
|----------|--------|-------------|
| 1  | 6  | Scheduled Date in YYMMDD |
| 7  | 2  | Employee Skill Level |
| 9  | 11 | Employee Id |
| 20 | 2  | Employee Shift Sequence Number |
| 22 | 21 | Last Name |
| 43 | 21 | First Name |
| 64 | 2  | Shift Start |
| 66 | 2  | Shift End |
| 68 | 2  | Off/On Clock Flag |
| 70 | 2  | Assign Names Flag |
| 72 | 2  | No. of Off Clock Breaks |

File Status for SCHEMP.DDF

Record Length = 74          Compressed Records = No
Number of Keys = 2          Variable Records = No
Page Size     = 1024        Unused Pages = 0
Total Records = 34

| Key | Position | Length | Duplicates | Modifiable | Type    | Null |
|-----|----------|--------|------------|------------|---------|------|
| 0   | 1        | 7      | No         | Yes        | Zstring | -- 34 |
| 0   | 8        | 2      | No         | Yes        | Integer | -- 34 |
| 0   | 10       | 11     | No         | Yes        | Zstring | -- 34 |
| 0   | 21       | 2      | No         | Yes        | Integer | -- 34 |
| 1   | 1        | 7      | Yes        | Yes        | Zstring | -- 17 |
| 1   | 10       | 11     | Yes        | Yes        | Zstring | -- 17 |
| 1   | 21       | 2      | Yes        | Yes        | Integer | -- 17 |

This file specifies what resources will be used in the Scheduler and where to find the initial values that these resources will be set to.

| Position | Length | | Description |
|----------|--------|---|-------------|
| 1  | 1  | Key | This is the create/update flag. |
| 2  | 8  |     | This is the source file key. |
| 10 | 2  |     | This is the resource type. |
| 12 | 2  |     | This is the resource sub-type. |
| 14 | 2  |     | This is the resource multiplier. |
| 16 | 2  |     | This is the resource calculation type. |
| 18 | 20 |     | This is the source name. |

File Status for SCHID.DDF

Record Length = 37    Variable Records = No
Number of Keys = 1
Page Size = 1024    Unused Pages = 0

| Key | Position | Length | Duplicates | Modifiable | Type | Null |
|---|---|---|---|---|---|---|
| 0 | 1 | 1 | Yes | No | String | -- |

This file is used to maintain a miscellaneous lookup file.

| Position | Length | | Description |
|---|---|---|---|
| 1 | 8 | Key | This is the parameter key used in conjunction with the column number to obtain a lookup value. |
| 9 | 5 | Key | This is the parameter column number used in conjunction with the parameter key to obtain a lookup value. A greater than or equal logic is used. |
| 14 | 5 | | This is the value returned when the above conditions are met. |

File Status for SCHPARA.DDF

Record Length = 18    Variable Records = No
Number of Keys = 1
Page Size = 1024    Unused Pages = 0

| Key | Position | Length | Duplicates | Modifiable | Type | Null |
|---|---|---|---|---|---|---|
| 0 | 1 | 13 | Yes | No | String | -- |

How each task is related to other tasks, open closed times and days of week. Example: some tasks can only be performed after another task, but before closing time. This is a relation and this is what this file describes.

| Position | Length | | Description |
|---|---|---|---|
| 1 | 5 | Key | This is the task ID for a given task, whose placement on the schedule is based on this relation. |
| 6 | 2 | | This is a group of relations. If a placement site cannot be found based on the first group of relations then the next group of relations will be used. Each group of relations will be used until a placement site can be found on the schedule. If a site cannot be found using any of the task relation groups then the task will not be placed on the schedule. |
| 8 | 5 | | This is the task relation ID that is the ID for a task already on the schedule. (The ID's 0..9 are reserved for fixed locations on the schedule, i.e. Open/Closed time, First/Last tasks, etc.) |
| 13 | 1 | | This is the relation number and is used when you are looking for the (n)th occurrence of a task on the schedule. For example, a cleanup task must be placed between the 2nd and 3rd mix of the day. |

| | | |
|---|---|---|
| 14 | 4 | This is the offset from the above relation, marked in 15 minute segments. This is also used to mark the days of the week that a task can be scheduled (using the bits in the lower byte as day flags). For an offset, an example would be: 2 hours after open time. |
| 18 | 2 | This is the counter used to find the (n)th occurrence of a relation, or the first (99) or last occurrence. |

File Status for SCHREL.DDF

Record Length = 19        Variable Records = No
Number of Keys = 1
Page Size      = 1024     Unused Pages = 0

| Key | Position | Length | Duplicates | Modifiable | Type | Null |
|---|---|---|---|---|---|---|
| 0 | 1 | 5 | Yes | No | String | -- |

A resource is an item that may be of limited supply, or a reference value or it may keep track of values on the schedule. For a task's use of resources, it means a item that is of limited supply. Resources are tracked every 15 minutes on the schedule and are used to determine if an item is available for this task. This file describes what items a given task uses.

| Position | Length | Description |
|---|---|---|
| 1 | 1 Key | This is the lookup create flag. Valid values are:<br>"0" - Create resource.<br>"1" - Load resource from STMS.DDF.<br>"2" - Load resource from SCHDAY.DDF.<br>"3" - Load resource from SLSCUR.DDF. |
| 2 | 5 Key | This is the lookup key ID. For STMS.DDF or SCHDAY.DDF, this key is a string. For SLSCUR.DDF Byte 1 = 1: Sales, 1: Customer count. Byte 2 = 0; Totals, 2 PLU. Byte 3-6 = 0-9999; Dept/PLU Number. |
| 7 | 2 | This is the resource type. |
| 9 | 2 | This is the resource sub-type. |
| 11 | 5 | This is the multiplier. |
| 16 | 2 | This is the calculation type field. Valid values are:<br>"0" - Decreasing resource.<br>"1" - Constant resource.<br>"2" - Increasing resource. |
| 17 | 20 | This is the description of the resource. |

File Status for SCHRES.DDF

Record Length = 36        Variable Records = No
Number of Keys = 1
Page Size      = 1024 Unused Pages = 0

| Key | Position | Length | Duplicates | Modifiable | Type | Null |
|---|---|---|---|---|---|---|
| 0 | 1 | 1 | Yes | No | String | -- |
| 0 | 2 | 5 | Yes | No | String | -- |

This file contains header information for each day that has been scheduled. There is only 1 header record for each date.

| Position | Length | | Description |
|---|---|---|---|
| 0 | 6 | Key | This is scheduled date. |
| 6 | 2 | Key | This is the day of the week. |
| 8 | 2 | Key | This is the day type. |
| 10 | 2 | | This is the open time (in 15 minute segments from midnight). |
| 12 | 2 | | This is the close time (in 15 minute segments from midnight). |
| 14 | 2 | | This is the estimated sales for this day. |
| 16 | 11 | | This is the store number. |
| 27 | 2 | | This is the minimum Legal Shift (in 15 minute segments). |
| 29 | 2 | | This is the starting position of the first task. |
| 31 | 2 | | This is the position of the last task on the schedule. |
| 33 | 96 | | This is the array of resources 20..0 for every 15 minutes of the day. |
| 129 | 2 | | This is the original total hours (Not Used). |
| 131 | 2 | | This is the total hours on schedule. |
| 133 | 2 | | This specifies whether the names have been assigned or not. Valid values are:<br>"0" - Names not assigned.<br>"1" - Assigned. |

File Status for SCHSCH.DDF

Record Length = 136      Variable Records = No
Number of Keys = 1
Page Size = 1024         Unused Pages = 0

| Key | Position | Length | Duplicates | Modifiable | Type | Null |
|---|---|---|---|---|---|---|
| 0 | 1 | 7 | No | Yes | Zstring | -- |

The Skill Shift File is used to define any fixed shifts for a skill level and also the minimum/maximum shift length for a skill level.

| Position | Length | | Description |
|---|---|---|---|
| 1 | 2 | Key | This is the skill level. |
| 3 | 1 | | This is the shift defined flag. Valid values are:<br>"0" - Use these values.<br>"1" - Read from STMS.DDF file.<br>"2" - Read from SCHDAY.DDF file. |

| Position | Length | | Description |
|---|---|---|---|
| 4 | 8 | | This is the source file shift start key. |
| 12 | 8 | | This is the source file shift length key. |
| 20 | 3 | | This is the shift logic flag. This will perform functions depending on a combination of the values. Valid values will be one or a combination of the following values:<br>"1" — Only as long as tasks.<br>"2" — Fill to maximum length.<br>"4" — Fill to minimum length.<br>"8" — Must be first shift.<br>"16" — Must be last shift.<br>"32" — Must be a shift.<br>"128" — Must have a shift, if the shift is not a fixed shift above. |
| 23 | 4 | | This is the minimum shift length. |
| 27 | 4 | | This is the maximum shift length. |
| 31 | 4 | | This is the complete shift type. |
| 35 | 4 | | This field is reserved. |
| 39 | 20 | | This is the shift name. |

File Status for SCHSFT.DDF

Record Length = 58     Variable Records = No
Number of Keys = 1
Page Size = 1024       Unused Pages = 0

| Key | Position | Length | Duplicates | Modifiable | Type | Null |
|---|---|---|---|---|---|---|
| 0 | 1 | 2 | No | No | String | -- |

Contains the task information for each employee on the schedule.

| Position | Length | | Description |
|---|---|---|---|
| 0 | 6 | Key | This is the schedule date. |
| 6 | 2 | Key | This is the employee skill level. |
| 8 | 11 | Key | This is the employee ID. |
| 19 | 2 | Key | This is the shift serial number (for split shifts). |
| 21 | 2 | | This is the relation ID number. |
| 23 | 21 | | This is the task number. |
| 44 | 1 | | This is the task letter. |
| 45 | 2 | | This is the task start time (in 15 minute segments). |
| 47 | 2 | | This is the task length (in 15 minute segments). |
| 49 | 2 | | This is the percent of employee time. |
| 51 | 2 | | This is the skill level. |
| 53 | 2 | | This is the positive slide. |
| 55 | 2 | | This is the negative slide. |
| 57 | 2 | | There are the task type flags. Valid values are:<br>"Bit 0" - Single Task (0=split, 1=not split).<br>"Bit 1" - Pool Task (0=regular, 1=Pool).<br>"Bit 2" - Edit Slide (0=no, 1=yes).<br>"Bit 3" - Break Replace (0=no, 1=yes). |
| 59 | 2 | | This is the placement type. |

File Status for SCHTASK.DDF

Record Length = 62        Variable Records = No
Number of Keys = 1
Page Size = 1024          Unused Pages = 0

| Key | Position | Length | Duplicates | Modifiable | Type | Null |
|---|---|---|---|---|---|---|
| 0 | 1 | 7 | Yes | Yes | Zstring | -- |
| 0 | 8 | 2 | Yes | Yes | Integer | -- |
| 0 | 10 | 11 | Yes | Yes | Zstring | -- |
| 0 | 21 | 2 | Yes | Yes | Integer | -- |

This file allows the maintenance of any task that can be scheduled by the Scheduler.

| Position | Length | Description |
|---|---|---|
| 1 | 3 Key | This is the task priority. |
| 4 | 2 | This is the logic type. Valid values are:<br>"0" - (#0) Task Length = Relations.<br>"1" - (#1) Generic.<br>"2" - (#2) Task Length = Calculation.<br>"3" - (#3) Inventory on W-End, M-End, Ques (Calc #3 = default).<br>"4" - (#4) Deposit Task (DEP in Store).<br>"5" - (#5) Task Length = Calc (Backwards).<br>"6" - (#6) Task Length = Relations (Est. Sales).<br>"7" - (#7) Fields Mixing Table.<br>"8" - (#8) Same as #0 but Calc #9 Must Be > 0. |
| 6 | 5 | This is the task ID. The task ID is a unique ID for each task. The ID is a number from 0 to 32,000. Task numbers 0-9 are reserved. |
| 11 | 20 | This is the task name. The task name will be displayed on the schedules that are printed out. They do not have to be unique. |
| 31 | 1 | This is the task code. The task code will appear on schedules that are created. The code need not be unique. |
| 32 | 4 | This is the start time. Enter the start time in 15 minute increments starting at midnight. Valid values are:<br>"Any valid time"<br>"-1" - Will calculate the start time.<br>"-2" - Will be set by relations. |
| 36 | 4 | This is the task length. The task length is in 15 minute increments. Valid values are:<br>"Any valid time"<br>"-1" - Will calculate the task length.<br>"-2" - Will be set by relations. |
| 40 | 3 | This is the task percent. This is the percentage of a person's time it takes to do the task (0-100). |
| 43 | 2 | This is the task skill level. Skill levels are 0-11 (0=top) |

| Position | Length | Description |
|---|---|---|
| 45 | 4 | This is the positive slide. The positive slide is in 15 minute increments. Valid values are:<br>"Any valid time"<br>"-1" – Will calculate positive slide.<br>"-2" – Will be set by relations. |
| 49 | 4 | This is the negative slide. The negative slide is in 15 minute increments. Valid values are:<br>"Any valid time"<br>"-1" – Will calculate negative slide.<br>"-2" – Will be set by relations. |
| 53 | 3 | This is the task type flags. These flags are bit flags (76543210).<br><br>Valid values are:<br>"0" – 1 = Can't Split.<br>"1" – 2 = Pool Task.<br>"2" – 4 = Change Skill When Moved.<br>"3" – 8 = Break CAN Replace.<br>"4-7" – – = <unused>. |
| 56 | 3 | This is the task placement flag. The following flags change the way the task is placed on the schedule. Valid values are:<br>"0" – As is.<br>"1" – Left Justify.<br>"2" – Right Justify.<br>"4" – Start at Low Sales Hour.<br>"8" – Append to Left Shift.<br>"9" – Append to First Left Shift.<br>"16" – Append to Right Shift.<br>"17" – Append to First Right Shift.<br>"32" – Start at Low Staff Hour.<br>"64" – Alternate Left/Right.<br>"128" – Append to Left Shift (ignore 0).<br>"256" – Append to Right Shift (ignore 0). |

File Status for SCHTASKS.DDF

Record Length = 58    Variable Records = No
Number of Keys = 1
Page Size = 1024    Unused Pages = 0

| Key | Position | Length | Duplicates | Modifiable | Type | Null |
|---|---|---|---|---|---|---|
| 0 | 1 | 3 | Yes | No | String | -- |

This is the Sales Curve File for the production planner.

| Position | Length | Description |
|---|---|---|
| 1 | 2 Key | This is the season. |
| 3 | 1 Key | This is the Production Group type. Valid values are:<br>"0" – Sales.<br>"1" – Check count.<br>"2" – Customer count.<br>"3-9" – Reserved. |

| | | | |
|---|---|---|---|
| 4 | 1 | Key | This is the Production Sub Group Key. Valid values are: |

"0"  –  Total sales.
                         "1"  –  Dept (function of sales).
                         "2"  –  PLU (function of sales).
                         "3"  –  Other (function of sales).

"0"  –  Total Check Count.
                         "1"  –  Check Count 1 (function of Total Check Count)
                         "2"  –  Check Count 2 ("").

"0"  –  Total customer count.
                         "1"  –  Customer 1.
                         "2"  –  Customer 2.

| | | | |
|---|---|---|---|
| 5 | 4 | Key | This is the production key (PLU# or DEPT# or inventory# or other#). |
| 9 | 10 | | This is the total value. |
| 19 | 192 | | This is the Curve Values (if percentage, then 2 digit implied decimal. 1% is 100%, 99% is 9900% then instead of dividing by 100 divide by 10,000. (i.e., 100 planning items and 96 periods.)) |

Total Sales:      "0" + "0" + "0".
                 Dept. sales:      "0" + "1" + DEPT#.
                 PLU sales  :      "0" + "2" PLU#.
                 Total Customer Cnt:  "1" + "0" + cust. key.
                 Customer cnt 1   :  "1" + "1" + cust. key.
                 Customer cnt 2   :  "1" + "2" + cust. key.

File Status for SLSCUR.DDF

Record Length = 210     Variable Records = No
Number of Keys = 1
Page Size     = 1024    Unused Pages = 0

| Key | Position | Length | Duplicates | Modifiable | Type | Null |
|---|---|---|---|---|---|---|
| 0 | 1 | 2 | No | Yes | String | -- |
| 0 | 3 | 1 | No | Yes | String | -- |
| 0 | 4 | 1 | No | Yes | String | -- |
| 0 | 5 | 4 | No | Yes | String | -- |

This is the Sales Curve File for the production planner.

| Position | Length | | Description |
|---|---|---|---|
| 1 | 2 | Key | This is the season. |
| 3 | 1 | Key | This is the Production Group type. Valid values are: |

"0"  –  Sales.
                       "1"  –  Check count.
                       "2"  –  Customer count.
                       "3-9" –  Reserved.

| | | | |
|---|---|---|---|
| 4 | 1 | Key | This is the Production Sub Group Key. Valid values are: |

"0"  –  Total sales.
                       "1"  –  Dept (function of sales).

```
"2"   -   PLU (function of sales).
"3"   -   Other (function of sales).

"0"   -   Total Check Count.
"1"   -   Check Count 1 (function of Total Check
          Count)
"2"   -   Check Count 2 ("").

"0"   -   Total customer count.
"1"   -   Customer 1.
"2"   -   Customer 2.
```

| Position | Length | | Description |
|---|---|---|---|
| 5 | 4 | Key | This is the production key (PLU# or DEPT# or inventory# or other#). |
| 9 | 10 | | This is the total value. |
| 19 | 192 | | This is the Curve Values (if percentage, then 2 digit implied decimal. 1% is 100%, 99% is 9900% then instead of dividing by 100 divide by 10,000. (i.e., 100 planning items and 96 periods.)) |

```
Total Sales:        "0" + "0" + "0".
Dept. sales:        "0" + "1" + DEPT#.
PLU sales   :       "0" + "2" PLU#.
Total Customer Cnt: "1" + "0" + cust. key.
Customer cnt 1  :   "1" + "1" + cust. key.
Customer cnt 2  :   "1" + "2" + cust. key.
```

This file allows the maintenance of the Break Logic Shift Length File by state.

| Position | Length | Description |
|---|---|---|
| 1 | 2 Key | This is the state code that is used to locate the legal shift/break limits. The location file contains the state code that is used to index into this file. |
| 3 | 4 | This is the minimum amount of time an employee is required to work before a paid break is entitled. |
| 7 | 4 | This is the time interval that is required between paid breaks. |
| 11 | 4 | This is the length of the paid break. |
| 15 | 4 | This is the minimum amount of time an employee is required to work before a unpaid break is entitled. |
| 19 | 4 | This is the time interval that is required between unpaid breaks. |
| 23 | 4 | This is the length of the unpaid break. |
| 27 | 4 | This is the minimum legal shift for the state or country. If a skill shift minimum is less than the legal minimum, then the legal minimum is used. |
| 31 | 4 | This is the maximum legal shift for the state or country. If a skill shift maximum is greater than the legal maximum, then the legal maximum is used. |

| Position | Length | | Description |
|---|---|---|---|
| 35 | 2 | | This is the maximum legal hours for the state or country an employee can work before overtime pay becomes effective. |
| 37 | 34 | | Filler. |

File Status for STATE.DDF

Record Length = 70  Variable Records = No
Number of Keys = 1
Page Size     = 1024  Unused Pages = 0

| Key | Position | Length | Duplicates | Modifiable | Type | Null |
|---|---|---|---|---|---|---|
| 0 | 1 | 2 | No | No | String | -- |

This file allows the maintenance of the Break Logic Shift Length File by state.

| Position | Length | | Description |
|---|---|---|---|
| 1 | 2 | Key | This is the state code that is used to locate the legal shift/break limits. The location file contains the state code that is used to index into this file. |
| 3 | 4 | | This is the minimum amount of time an employee is required to work before a paid break is entitled. |
| 7 | 4 | | This is the time interval that is required between paid breaks. |
| 11 | 4 | | This is the length of the paid break. |
| 15 | 4 | | This is the minimum amount of time an employee is required to work before a unpaid break is entitled. |
| 19 | 4 | | This is the time interval that is required between unpaid breaks. |
| 23 | 4 | | This is the length of the unpaid break. |
| 27 | 4 | | This is the minimum legal shift for the state or country. If a skill shift minimum is less than the legal minimum, then the legal minimum is used. |
| 31 | 4 | | This is the maximum legal shift for the state or country. If a skill shift maximum is greater than the legal maximum, then the legal maximum is used. |
| 35 | 2 | | This is the maximum legal hours for the state or country an employee can work before overtime pay becomes effective. |
| 37 | 34 | | Filler. |

File Status for STATE.DDF

Record Length = 70  Variable Records = No
Number of Keys = 1
Page Size     = 1024  Unused Pages = 0

| Key | Position | Length | Duplicates | Modifiable | Type | Null |
|---|---|---|---|---|---|---|
| 0 | 1 | 2 | No | No | String | -- |

| Position | Length | | Description |
|---|---|---|---|
| 1 | 3 | Key | Store key values. |
| 4 | 23 | | This is a description of the store key. |
| 24 | 37 | | This is the data value. Programs use this area to specify values needed in the program. |

File Status for STMS.DDF

Record Length = 60          Variable Records = No
Number of Keys = 1
Page Size      = 1024       Unused Pages = 0

| Key | Position | Length | Duplicates | Modifiable | Type | Null |
|---|---|---|---|---|---|---|
| 0 | 1 | 3 | No | No | String | -- |

| Position | Length | | Description |
|---|---|---|---|
| 1 | 10 | Key | This is the employee number. |
| 11 | 15 | Key | This is the first name of the employee. |
| 26 | 15 | Key | This is the last name of the employee. |
| 41 | 1 | | This is the middle initial of the employee. |
| 42 | 6 | | This is hire date of the employee. |
| 48 | 6 | | This is the termination date of the employee. |
| 54 | 11 | | This is the social security number of the employee. |
| 65 | 30 | | This is the address where the employee is located. |
| 95 | 15 | | This is the city where the employee is located. |
| 110 | 2 | | This is the state where the employee is located. |
| 112 | 10 | | This is the zip code where the employee is located. |
| 122 | 13 | | This is the telephone number of the employee. |
| 135 | 7 | | This is the rate of pay per hour the employee is earning. |
| 142 | 1 | | This is the salary class of the employee. |
| 143 | 9 | | This is the job code of the employee displayed. The possible job codes will be defined by the user. |
| 152 | 19 | | Filler |

File Status for EMPM.DDF

Record Length = 170         Variable Records = No
Number of Keys = 2
Page Size      = 1024       Unused Pages = 0

| Key | Position | Length | Duplicates | Modifiable | Type | Null |
|---|---|---|---|---|---|---|
| 0 | 1 | 10 | Yes | Yes | String | -- |
| 1 | 11 | 15 | Yes | Yes | String | -- |
| 1 | 26 | 15 | Yes | Yes | String | -- |

EMPTIME.DDF
FIGURE 2(24)
= This file contains the work times that an employee can work for each day of the week and what skill levels and priorities (in relations to employees of the same skill level). The work times that the employee can not work are marked as 'X's on the time line that ranges from midnight to midnight.

File Length = 62

```
START    LEN  DESCRIPTION
======   ===  =====================================
0        10 k Employee ID (unique)
10        1 k Day of the Week (1=Sun..7=Sat)
11        2 k Skill level as setup by the scheduler (1..99)
13        1   Priority (1=highest..9=lowest) used within skill
                level.
14       48   Time line from midnight to midnight (in 1/2hr
                intervals).
```

Btrieve Utilities Version 5.00
Copyright 1982, 1988, Novell, Inc. All Rights Reserved.

File Stats for d:\labor\test\emptime.ddf
　　Record Length = 62　　　　Compressed Records = No
　Variable Records = No
　　Number of Keys = 1
　　　　Page Size = 1024　　　　Unused Pages = 0
　　Total Records = 359

| Key | Position | Length | Duplicates | Modifiable | Type | Null | Total |
|---|---|---|---|---|---|---|---|
| 0 | 1 | 10 | No | No | String | — | 359 |
| 0 | 11 | 1 | No | No | String | — | 359 |
| 0 | 12 | 2 | No | No | String | — | 359 |

What is claimed is:

1. A system for processing a plurality of variables to create a staff schedule for a plurality of unique remote locations, said system including:

a memory divided into separate data files of information including tasks to be performed and scheduled, the sequence of the tasks, resources available, and employee skill levels, availability and priority;

means coupled to said memory for storing and retrieving information in said memory;

an input device for entering information indicative of projected daily business volume and for designating the tasks to be performed;

generating means coupled to said memory and said input device for generating from the separate data files in said memory and from the information from said input device, schedules of tasks to be performed and the employees selected by availability by day of the week, employee skill levels, and employee priority or seniority, and minimum and maximum hours available per employee for establishing therefrom the shifts of employees by time interval and skill level requirements to perform the designated tasks, said generating means having placement logic for scheduling tasks and optimization logic for dividing the schedule into shifts according to skill levels; and a display coupled to said generating means, for displaying the schedules including the indications of the employees and tasks and the start and stop times therefor.

2. The system according to claim 1 wherein said memory further comprises information regarding applicable labor regulations regarding timing of daily shifts, overtime, required number and timing of paid and unpaid breaks, and minors; and representation of corporate standards and policies;

wherein said means for generating applies applicable regulations, standards and policies for weekly and daily overtime, minimum daily shifts, maximum daily shifts before overtime, required paid and unpaid breaks, lengths of paid and unpaid breaks, and regulations applicable to minors for generating therefrom staff schedules.

3. The system according to claim 2 wherein said means for generating selectively modifies the staff schedules in response to the combining of data about tasks at the location including location-specific values, location historical data, corporate standards to determine task duration, task start time, and the amount of time permitted for an employee to complete the task.

4. The system according to claim 1 wherein said means for generating selectively modifies the staff schedules by controlling the placement and movement of tasks on the staff schedules by relationships to other tasks, task start times, and task positive and negative slide relative to the completion time and duration of a task.

5. The system according to claim 1 wherein the means for generating selectively modifies the staff schedules by editing the generated staff schedules to override selected employee limitations and restrictions; and said display displays messages of violations of any regulations and standards attributable to the editing of the staff schedule.

6. The system according to claim 1 wherein said means for generating selectively assigns filler tasks to shifts of employees to form minimum shifts in accordance with the applicable regulations and standards.

7. A computer-implemented process for creating a staff schedule for a selected remote location from a plurality of variables stored in a memory, the process comprising steps of:

storing in the memory separate data files of information including tasks to be performed and scheduled; the sequential relationship of the tasks to other tasks; employee skill levels; resources available; employee availability by day of the week, employee's skill level, and employee's priority or seniority.

introducing information indicative of projected daily business volume and representative tasks to be performed and their priority.

designating the tasks to be performed by their priority;

retrieving the separate data files from memory for generating therefrom and from the information introduced, the tasks to be performed within selected time intervals to form therefrom schedules of the tasks to be performed and the employees required by time interval and skill level to perform the designated tasks;

optimizing the schedule generated in the retrieving step by dividing the schedule into shifts according to skill levels;

selecting employee availability by day of the week, employee skill levels, and employee priority or seniority, and minimum and maximum hours available per employee; and displaying the schedules including the indications of the employees and tasks and the start and stop times therefor.

8. The process according to claim 7 comprising the additional step of:

entering daily information representative of an alteration in the placement of a task in the schedule or representative of an additional task to be performed; and modifying the schedule to indicate the altered or additional task.

9. The process according to claim 7 comprising the steps of:

storing in the memory data files of information regarding corporate standards and policies;

modifying the schedules in response to the combining of data about tasks at the location including location-specific values, location historical data, corporate standards to determine task duration, task start time, and the amount of time for an employee to complete a task relative to standard time allotted for completion of the task.

10. The process according to claim 7 comprising the step of:

controlling the placement and movement of tasks on the staff schedules by relationships to other tasks, task start times, and task positive and negative slide relative to the completion time and duration of a task.

11. The process according to claim 7 comprising the steps of:

storing in the memory data files of information regarding applicable labor regulations regarding timing of daily shifts, overtime, number and timing of breaks, and minors; and representations of corporate standards and policies;

editing the generated staff schedules to override selected employee limitations and restrictions; and displaying messages of violations of any regulations and standards attributable to the editing of the staff schedules.

12. The process according to claim 7 comprising the step of:

assigning filler tasks to shifts of employees to form minimum shifts in accordance with the applicable regulations and standards.

* * * * *

UNITED STATES PATENT AND TRADEMARK OFFICE
CERTIFICATE OF CORRECTION

PATENT NO. : 5,111,391
DATED : May 5, 1992
INVENTOR(S) : Randall K. Fields, et al It is certified that error appears in the above-indentified patent and that said Letters Patent is hereby corrected as shown below:

Col. 4, line 42, "employee s" should be --employee's--.

Cols. 11 and 12, delete lines 26-41.

Cols. 13 and 14, delete lines 1-9.

Cols. 27 and 28, delete lines 35-46.

Cols. 29 and 30, delete lines 1-22.

Cols. 31 and 32, delete lines 11-42.

Cols. 33 and 34, before line 1, insert --This file defines store specific configuration values. Some key values are reserved for program specific functions. Other key values are user defined for specific programs.--.

Cols. 33 and 34, after line 11, insert --This is the employee master file.--.

Signed and Sealed this

Fourteenth Day of September, 1993

Attest:

Attesting Officer

BRUCE LEHMAN

Commissioner of Patents and Trademarks